(12) United States Patent
Lawrence et al.

(10) Patent No.: US 10,669,609 B2
(45) Date of Patent: Jun. 2, 2020

(54) METHOD FOR REDUCING SALT USAGE IN ALUMINUM RECYCLING

(71) Applicant: Air Products and Chemicals, Inc., Allentown, PA (US)

(72) Inventors: Martin Lawrence, Middlesex (GB); Petr Tlamicha, Dobrna (CZ)

(73) Assignee: Air Products and Chemicals, Inc., Allentown, PA (US)

( * ) Notice: Subject to any disclaimer, the term of this patent is extended or adjusted under 35 U.S.C. 154(b) by 248 days.

(21) Appl. No.: 15/845,113

(22) Filed: Dec. 18, 2017

(65) Prior Publication Data
US 2019/0185962 A1      Jun. 20, 2019

(51) Int. Cl.
| | |
|---|---|
| C22B 21/00 | (2006.01) |
| F27B 7/34 | (2006.01) |
| C22B 9/00 | (2006.01) |
| F27B 7/06 | (2006.01) |
| F27B 7/36 | (2006.01) |
| F27B 3/20 | (2006.01) |
| F27B 3/22 | (2006.01) |
| F27B 3/28 | (2006.01) |

(52) U.S. Cl.
CPC .......... *C22B 21/0084* (2013.01); *C22B 9/006* (2013.01); *C22B 21/0092* (2013.01); *F27B 3/205* (2013.01); *F27B 3/22* (2013.01); *F27B 3/28* (2013.01); *F27B 7/06* (2013.01); *F27B 7/34* (2013.01); *F27B 7/36* (2013.01)

(58) Field of Classification Search
CPC ............................ C22B 21/0084; C22B 9/006
See application file for complete search history.

(56) References Cited

U.S. PATENT DOCUMENTS

| | | | |
|---|---|---|---|
| 4,983,216 A | 1/1991 | Van Linden et al. | |
| 5,563,903 A | 10/1996 | Jebrail et al. | |
| 7,160,501 B2 * | 1/2007 | Summer | C22B 7/003 |
| | | | 266/173 |
| 8,806,847 B2 | 8/2014 | Blase et al. | |
| 9,091,484 B2 | 7/2015 | Hegenberg et al. | |

FOREIGN PATENT DOCUMENTS

| | | |
|---|---|---|
| EP | 0942247 | 9/1999 |
| EP | 0962540 A1 | 12/1999 |

* cited by examiner

*Primary Examiner* — Scott R Kastler
(74) *Attorney, Agent, or Firm* — Larry S. Zelson

(57) ABSTRACT

A method of melting an aluminum charge having no more that 4% salt by mass, including during a melting phase, introducing fuel and oxidant via a burner operating at a first firing rate, the fuel and oxidant reacting to form a combustion zone above the aluminum charge, terminating the melting phase and commencing a transition phase when the aluminum charge is nearly completely molten, during the transition phase, reducing the firing rate of the burner to a second firing rate lower than the first firing rate, introducing a non-oxidizing gas at a first velocity to form a non-oxidizing zone between the combustion zone and the aluminum charge, and allowing the aluminum charge to become completely molten, and terminating the transition phase and commencing a tapping phase after the aluminum charge has become completely molten, and during the tapping phase, pouring the molten aluminum charge out of the furnace.

12 Claims, 12 Drawing Sheets

METHOD FOR REDUCING SALT USAGE IN ALUMINUM RECYCLING

BACKGROUND

A substantial amount of salt is typically required for aluminum scrap remelting (recycling). Once used, the salt-containing residue is known as aluminum dross or saltcake. Saltcake is regarded as hazardous waste and therefore cannot be put into a landfill. Saltcake is normally sent, at further cost, to a recycling plant, where the salt is extracted and cleaned back to near its original specification, so that it can be used again.

In the process of remelting aluminum scrap in secondary aluminum production, the addition of a significant amount of salt means that salt can account for a substantial portion of the overall weight of the charged material. The material charged into the furnace consists of mainly aluminum scrap and salt. There are also additional materials that are purposely added to the mixture, depending on specific product requirements. For example, there are many different types of aluminum scrap which vary in composition and can contain various contaminants. For the purposes of this disclosure, the contaminants will be described as metal impurities (e.g., Mg, Si, Ca, Zn, Mn), oxides (e.g., MgO, $SiO_2$, $Al_2O_3$), and organics (e.g., hydrocarbons, plastics, paints, coatings). Types of scrap can vary considerably, where new/clean scrap is considered to have more than 95% aluminum and any scrap with more than 5% contaminants is old/dirty scrap. Some scrap contains significantly more contaminants than others, such as coated packaging, where more than 20% of the material can consist of contaminants. Contaminants such as organics are removed during an initial stage of the melting process (i.e., the organics combust at low temperatures while the scrap is being heated).

Aluminum has a high affinity for oxygen and quickly forms a thin oxide layer when exposed to an oxidizing atmosphere. Therefore, all scrap has some percentage of aluminum oxide present from the onset of recycling. The aluminum oxide shell has a much higher melting point than the aluminum and therefore does not melt inside an aluminum recycling furnace. The aluminum oxide shell must be chemically or mechanically broken, allowing the molten aluminum to escape. Subsequently, the less dense oxide material floats to the surface. If the molten aluminum is not protected from the oxidizing atmosphere inside the furnace, it will undergo further oxidation, reducing yield. The formation of the additional aluminum oxide acts like a net, trapping molten aluminum within its structure, also reducing yield.

Salt is added to the furnace in order to improve the melting process and can have a number of benefits. Typically, the mass of salt added to the aluminum scrap in the furnace is from about 5% to about 15% of the mass of the aluminum scrap, depending on the type of scrap, the type of furnace, the operating methodology, and several other parameters. The main duty of salt is to protect the aluminum from the oxidizing atmosphere. Salt also partakes in the reaction by providing a chemical mechanism for breaking up the aluminum oxide shell of the scrap. The salt aids in breaking up the aluminum oxide formed during the melt, releasing some of the entrapped aluminum. Mechanical stirrers or rotary furnaces are often used for aiding the breaking up of aluminum oxide. Salt also reacts with metal impurities to aid in removing them. Other benefits of salt include changing the melt properties, such as density and viscosity, improving the separation between the melt and its contaminants.

Different types of aluminum melting furnaces have been devised to reduce the amount of salt used in the recycling process. However, those that eliminate a significant amount of the salt are much less efficient and therefore are not the ideal solution. There is a need in the industry for providing significant cost savings by reducing salt usage without causing significant detriment to the cycle efficiency, yield, or cost.

An earlier patent, U.S. Pat. No. 5,563,903, describes a method of introducing a single non-oxidizing (protective) layer or stratum of gas into an aluminum recycling furnace between the combustion zone or strata and the aluminum, in order to reduce oxidative attack on the aluminum and to thereby decrease dross formation and increase yield. This scheme is shown generally in FIG. 1. A non-oxidizing layer 101 may comprise an inert gas such as nitrogen or argon, or a reducing gas such as hydrogen, methane, or other hydrocarbon. In this implementation, both combustion reactants 104 (for example natural gas and air/oxygen) and a non-oxidizing gas 105 (for example nitrogen) are introduced at low velocities into the furnace, in order to minimize mixing of the two strata of gases 101 and 103. Specifically, a low velocity burner, either a laminar flow burner or a premixed radiant-type burner, is recommended to reduce mixing between the combustion layer 103 and the non-oxidizing layer 101, and the velocity of the non-oxidizing gas 105 is taught not to exceed 50 feet per second, and preferably to be less than 20 feet per second. There is no reduction in salt consumption.

Other attempts have been made to reduce oxidation of the metal, for example by using an oxidant-staged burner that forms a fuel-rich (reducing) flame near the metal surface and a stoichiometric or fuel-lean flame on the opposite side of the fuel-rich flame from the metal bath. See, for example, U.S. Pat. No. 8,806,897, albeit relating to glass furnaces. Similarly, a system such as described in EP 0962540 provides an oxygen lance above an air-fuel burner, which is operated with a sub-stoichiometric amount of air (i.e., fuel-rich). The oxygen lance must be installed above the burner, so that the reducing atmosphere of the fuel-rich burner acts as the barrier between the oxidizing flow and the aluminum.

In addition, other systems employ a similar idea to effectively create a non-oxidizing or reducing layer by operating a standard tube-in-tube (two concentric tubes or pipes) burner with oxidizer flowing through the central tube and fuel flowing through the annular space between the tubes. This inhibits oxygen contact with the melt because it is used up in the combustion zone. While such an arrangement tends to reduce the oxygen escaping from the burner, it does nothing actively to protect the molten aluminum from those free oxygen molecules that do escape.

BRIEF DESCRIPTION OF THE DRAWINGS

The present invention will hereinafter be described in conjunction with the appended figures wherein like numerals denote like elements.

SUMMARY OF THE INVENTION

Figure 1:
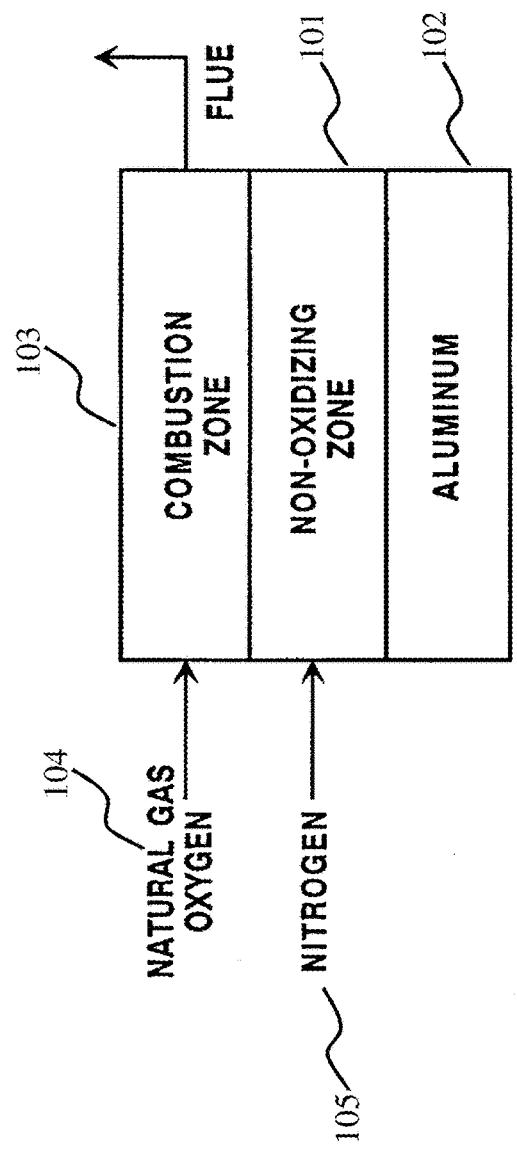
FIG. 1 is an illustration of a prior art furnace with a stratified non-oxidizing layer between a combustion zone and an aluminum bath.

In one aspect, a method of melting in a furnace an aluminum charge comprising no more that 4% salt on a mass basis, comprises during a melting phase, introducing fuel and oxidant into the furnace via a burner operating at a first firing rate, the fuel and oxidant reacting to form a combustion zone above the aluminum charge, terminating the melting phase and commencing a transition phase when the aluminum charge is nearly completely molten, during the transition phase, reducing the firing rate of the burner to a second firing rate that is lower than the first firing rate, introducing a non-oxidizing gas into the furnace at a first velocity to form a non-oxidizing zone between the combustion zone and the aluminum charge, and allowing the aluminum charge to become completely molten, and terminating the transition phase and commencing a tapping phase at a time after the aluminum charge has become completely molten, and during the tapping phase, pouring the molten aluminum charge out of the furnace.

In one embodiment, the method further comprises the steps of, after the transition phase and before the tapping phase, commencing a stirring phase, comprising the steps of halting the flow of non-oxidizing gas, stirring the molten aluminum charge, and resuming the flow of non-oxidizing gas at a second velocity. In one embodiment, the molten aluminum charge is stirred by use of a large implement attached to a construction vehicle, and/or by rolling the furnace about an axis. In one embodiment, the method further comprises, during the tapping phase, flowing the non-oxidizing gas at a third velocity over the molten aluminum charge while pouring the molten aluminum charge out of the furnace. In one embodiment, the non-oxidizing gas is an inert gas, and wherein the non-oxidizing zone is an inert zone. In one embodiment, the inert gas is nitrogen, argon, or a mixture thereof. In the above embodiments, the second velocity and the third velocity may each be the same as of different from the first velocity.

In one embodiment, the flow of non-oxidizing gas is introduced at an angle complementary to an angle of the flow of fuel and oxidant, such that the flow of the non-oxidizing gas and the flow of the fuel and oxidant will not disturb one another. In one embodiment, the flow of non-oxidizing gas forms a blanket above the molten aluminum. In one embodiment, the first velocity of the non-oxidizing gas flow is at least 400 m/s. In one embodiment, the second velocity of the non-oxidizing gas flow is less than the first velocity. In one embodiment, the third velocity of the non-oxidizing gas flow is at least 200 m/s. In one embodiment, the method further comprises, during the tapping phase, cooling the flow of non-oxidizing gas, and convectively cooling the molten aluminum with the flow of non-oxidizing gas.

In another aspect, a system for melting an aluminum charge comprises no more than 5% salt on a mass basis in a furnace having a door, comprising a burner mounted in the door of the furnace, the burner being configured to introduce fuel and oxidant into the furnace to form a combustion zone above the aluminum charge, a lance configured to introduce a non-oxidizing gas into the furnace to form a non-oxidizing zone between the combustion zone and the aluminum charge, and a gas injector configured to introduce a non-oxidizing gas near the door of the furnace. In one embodiment, the burner and the lance are mounted to the door of the furnace.

In one embodiment, the lance is configured to introduce non-oxidizing gas at a velocity of at least 400 m/s. In one embodiment, the burner and the lance are oriented substantially perpendicular to the door. In one embodiment, the gas injector comprises a manifold having one or more outlets, the one or more outlets configured to deliver a planar flow of non-oxidizing gas into the furnace when the door is open. In one embodiment, the one or more outlets comprises a single, flat, wide outlet. In one embodiment, the gas injector is configured to deliver the non-oxidizing gas at a velocity of at least 200 m/s. In one embodiment, the gas injector is oriented such that the outlets introduce the flow of non-oxidizing gas substantially parallel to a top surface of the aluminum charge.

DETAILED DESCRIPTION

It is to be understood that the figures and descriptions of the present invention have been simplified to illustrate elements that are relevant for a clear understanding of the present invention, while eliminating, for the purpose of clarity, many other elements found in related systems and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20%, ±10%, ±5%, ±1%, and ±0.1% from the specified value, as such variations are appropriate.

As used herein, "combustion gases" means a combination of at least one hydrocarbon-containing fuel and at least one oxygen-containing oxidant capable of sustaining a heat-releasing combustion reaction, in which the hydrocarbon reacts with the oxygen, including without limitation hydrocarbon-containing fuels such as gaseous fuel, liquid fuel, and solid fuel in a transport gas, and oxygen-containing oxidants such as air, vitiated air (having less than about 21% molecular oxygen), oxygen-enriched air (having greater than about 21% molecular oxygen, at least 23% molecular oxygen, at least 70% molecular oxygen, at least 90% molecular oxygen), or industrial-grade oxygen (at least 93% molecular oxygen, at least 95% molecular oxygen, or at least 99% molecular oxygen).

A burner of the present invention may be described as having a "firing rate." As understood by a person of ordinary skill in the art, the firing rate of a burner is the rate at which the burner imparts energy on its surroundings, and is typically calculated as the flow rate of fuel multiplied by the theoretical calorific value of completely combusting that fuel with a stoichiometric amount of oxygen (supplied by a flow rate of oxidant). At any given firing rate, the burner may also have a stoichiometry, which is the ratio of oxygen provided in the oxidant to the amount of oxygen theoretically required to completely combust the fuel without leaving any excess oxygen. At any given firing rate, a burner may be operated fuel-rich (with less than a stoichiometric amount of oxygen), at stoichiometry, or fuel-lean (with more than a stoichiometric amount of oxygen).

As used herein, a "non-oxidizing" gas is a gas that does not substantially oxidize hydrogen or hydrocarbon fuel at oxy-fuel combustion temperatures. Examples of non-oxidizing gases include, but are not limited to, inert gases such as argon, substantially inert gases such as nitrogen, and reducing gases, such as hydrogen or carbon monoxide. A "non-oxidizing gas," however, may react with fuel and oxidant to produce less than percent-level of products, for example, it being understood that a gas such as nitrogen may produce minor constituents such as NOx in combustion reactions.

The phrases "aluminum charge," "charge," and "charge weight" are used throughout the present disclosure. As understood by a person of ordinary skill in the art, an aluminum charge or charge is the material loaded into a furnace to be melted according to methods of the present invention. The charge comprises a quantity of scrap metal to be recycled, as well as a quantity of salt. The "charge weight" is the weight of the full charge, including the scrap and the salt. The "scrap weight" is the weight of the scrap alone, and the "salt weight" is the weight of the salt alone.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

Reduction in salt usage is highly desired in the aluminum recycling industry, as salt can be costly both to buy and to recycle. Described herein is a system and method for complementing lower salt content with high-velocity non-oxidizing gas blanketing to increase yield and efficiency in an aluminum recycling furnace. Methods of the present invention further protect aluminum from the water vapor in the furnace atmosphere, inhibiting the reaction of aluminum and water, reducing hydrogen absorption into the aluminum, as well as the consequent aluminum oxide formation. For optimum results, each individual furnace and aluminum scrap recipe should be carefully considered through preliminary testing, in order to determine the optimal process conditions, since the amount of salt to be saved will vary for different types of processes and scrap. The amount of salt that can be saved will depend on several factors, including the recipe of scrap being melted. However, it is expected that methods as described herein for saving salt will produce better results when compared with any other salt saving strategy for each type of scrap, respectively.

Parts of this disclosure refer to a tilt rotary furnace. Tilt rotary furnaces are known in the art, and are designed to process bulk material consisting of relatively small pieces, compared with a reverberatory furnace, where the main heat transfer mechanisms are flame radiation and gas convection. Whilst small particles have a high surface area, the shape and angle of the drum results in a comparatively small surface becoming exposed to the furnace atmosphere. Heat conduction between individual pieces of scrap is poor due to the large number of edges and the space between them. However, the rotation of the drum allows increased heat transfer through conduction at the furnace wall. The furnace wall is constantly being heated up and subsequently being submerged into the molten bath. Furthermore, the drum movement constantly stirs the charge, resulting in improved heat transfer.

Figure 2:
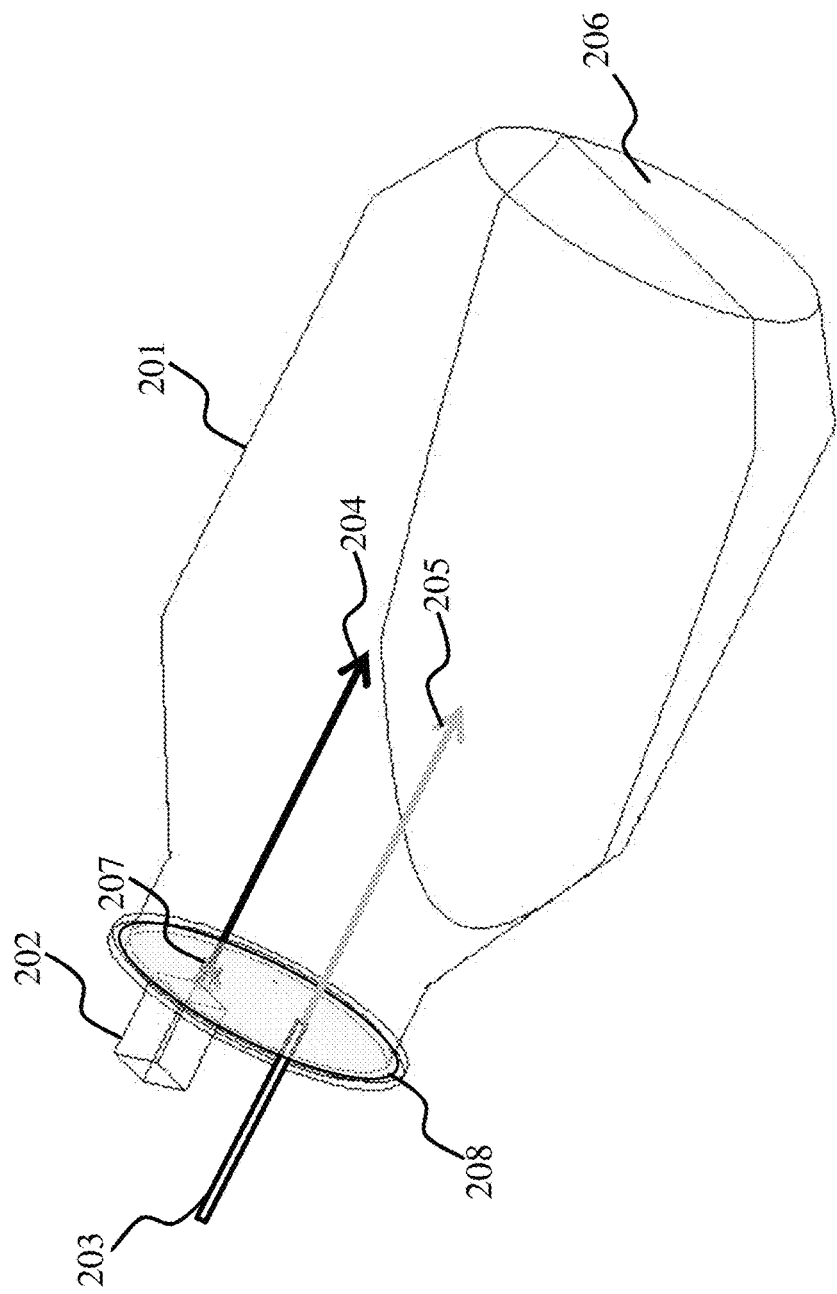
FIG. 2 is a side-view schematic showing an embodiment of a system for introducing a non-oxidizing zone between a combustion zone and an aluminum bath.

Referring now to FIG. 2, one embodiment of a system of the present invention is shown. A tilt rotary furnace 201 is charged with an aluminum charge or melt 206 including a quantity of aluminum scrap and a corresponding quantity of salt. The furnace 201 includes a burner 202 having a nozzle 207 positioned on a door 208. The burner 202 is configured to inject a flow of combustion gases 204 into the furnace 201, to heat the aluminum charge or melt 206. In some embodiments, the burner 202 may be fixedly attached perpendicular to the door 208, or alternatively the burner 202 may be mounted substantially parallel to the surface of the aluminum charge or melt 206 so that the flow of the combustion gases 204 is substantially parallel to the surface of the aluminum charge or melt 206. In some embodiments, the burner 202 is removable from the door 208 and is instead inserted into a hole (not shown) in the door 208. In some embodiments, the system further comprises a lance 203, which may be fixedly attached to the door 208 or inserted through the hole in the door 208. The lance 203 is configured to inject a non-oxidizing gas 205, and may similarly be mounted substantially perpendicular to the door 208 or substantially parallel to the surface of the aluminum charge or melt 206. In some embodiments, the lance 203 is mounted such that the flow of the non-oxidizing gas 205 is substantially parallel to the flow of the combustion gases 204 from the burner 202.

Figure 3:
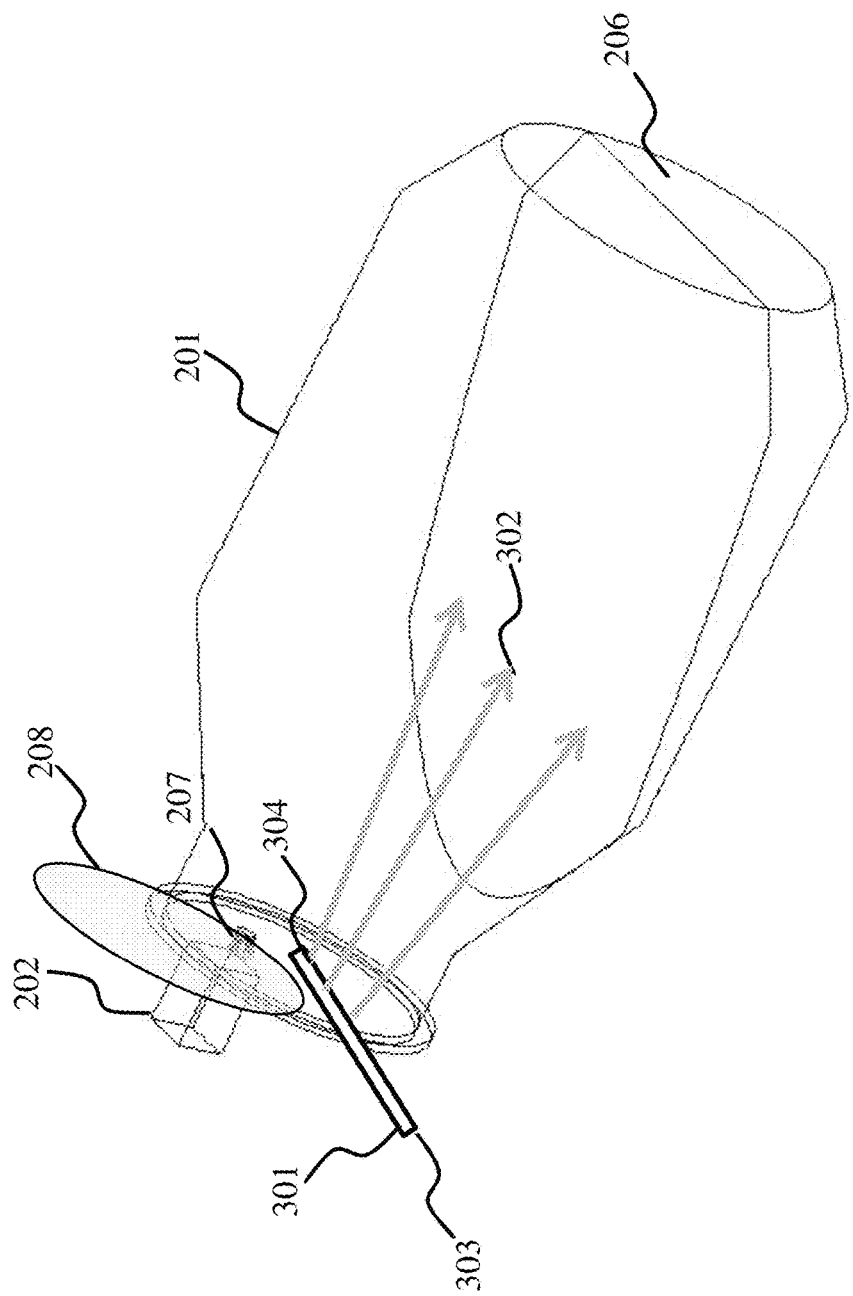
FIG. 3 is a side-view schematic showing an embodiment of a system for introducing an non-oxidizing zone between a combustion zone and an aluminum bath with the door in an open position.

Referring now to FIG. 3, one embodiment of the system of the present invention further comprises a gas injector 301, which may be fixedly attached to the outside of the furnace 201, to the door 208, or alternatively may be separate from the remainder of the apparatus and moved into position at the appropriate time. The gas injector 301 is a pipe or manifold having a plurality of nozzles or holes to distribute a non-oxidizing gas. In one embodiment, as show, the gas injector 301 may be a rake. In the depicted embodiment, the rake 301 comprises an inlet 303 and one or more outlet holes 304 positioned along the barrel, configured to inject one or more streams of non-oxidizing gas 302 into the furnace 201. In some embodiments, the rake 301 is mounted such that, when the door 208 is opened, the outlet holes 304 are oriented to inject streams of the non-oxidizing gas 302 substantially parallel to the surface of the aluminum charge or melt 206.

Figure 4A:
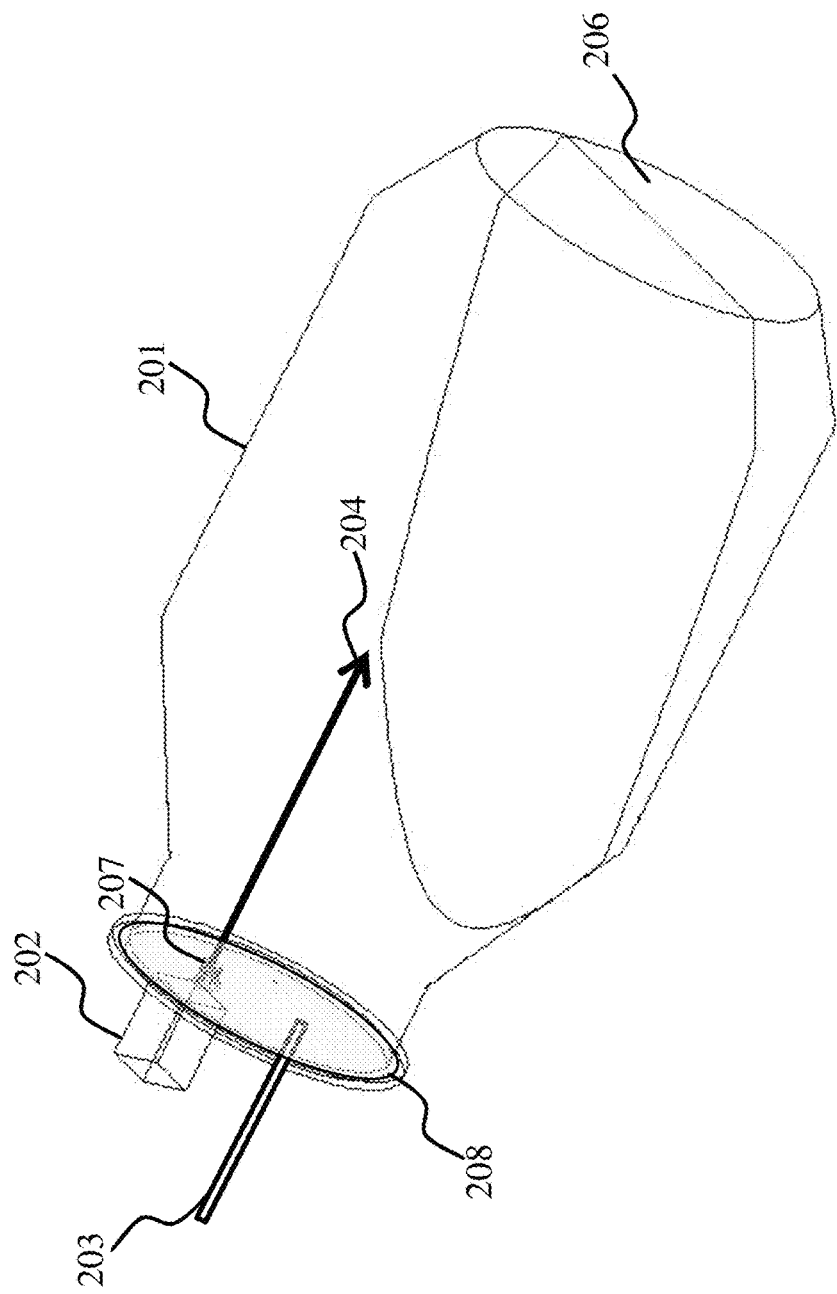
FIG. 4A is a schematic showing an embodiment of the invention in a melting phase.

Referring now to FIG. 4A, a melting phase of a method of the present invention is shown. In one embodiment, the initial parts of the melting phase are carried out according to standard practice followed by operators, where scrap is charged with salt as normal, but thanks to the improvements of the present invention, less salt is required. In one embodiment, a melt performed according to a method of the present invention requires at least 50% less salt than a conventional melt. In another embodiment, 80% less salt is required. The burner 207 operates at a high temperature and injects the combustion gases 204 into the tilt rotary furnace 201. In one embodiment, during the melting phase, there is little or no non-oxidizing gas flow from the non-oxidizing gas injector 203.

Figure 4B:
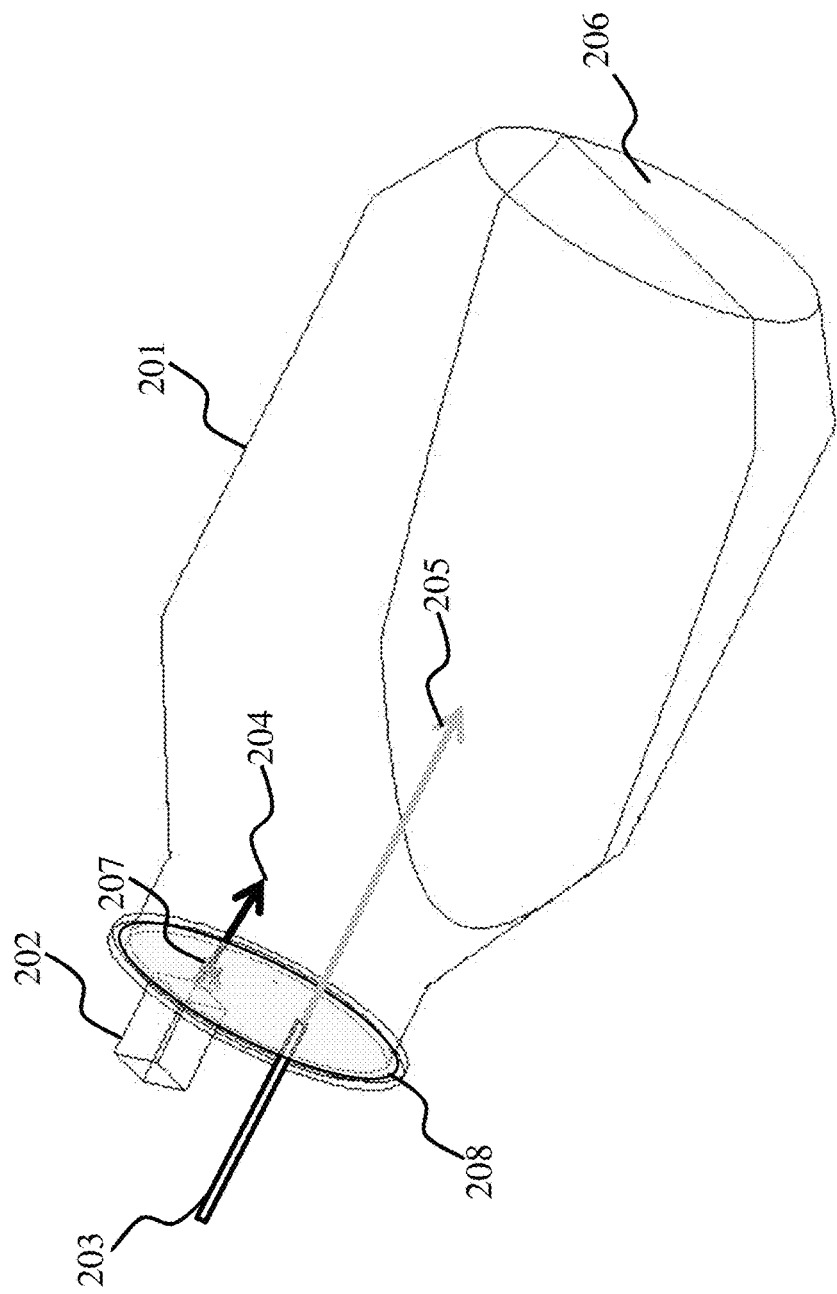
FIG. 4B is a schematic showing an embodiment of the invention in a transition phase.

In some embodiments, when the bath 206 is nearly melted, a transition phase begins. As shown in FIG. 4B, during a transition phase of a method of the present invention, the burner 207 is reduced to low fire or turned off. The non-oxidizing gas 205 is then injected via the non-oxidizing gas injector 203, where ideally two to three furnace volumes of gas should be injected over a five to ten minute period. In one embodiment, the non-oxidizing gas 205 is injected from the gas injector 203 at a velocity of about 425 m/s. In other embodiments, the gas injection velocity may be at least 200 m/s, at least 300 m/s, at least 400 m/s, or at least 500 m/s. It should be understood that the rate of non-oxidizing gas injection may vary by the type of scrap used, the type of non-oxidizing gas used, and the geometry of the furnace. In one embodiment, the non-oxidizing gas is injected via the lance 203. In one embodiment, the non-oxidizing gas 205 has a high flow velocity and the lance 203 is angled in such a way that the non-oxidizing gas flow complements that of the burner. Specifically, the lance 203 and the burner 207 are angled such that if the burner 207 remains on during the injection of the non-oxidizing gas 205, the two flows 204 and 205 will not disturb one another and the non-oxidizing gas 205 forms a blanket above the molten metal 206.

Figure 4C:
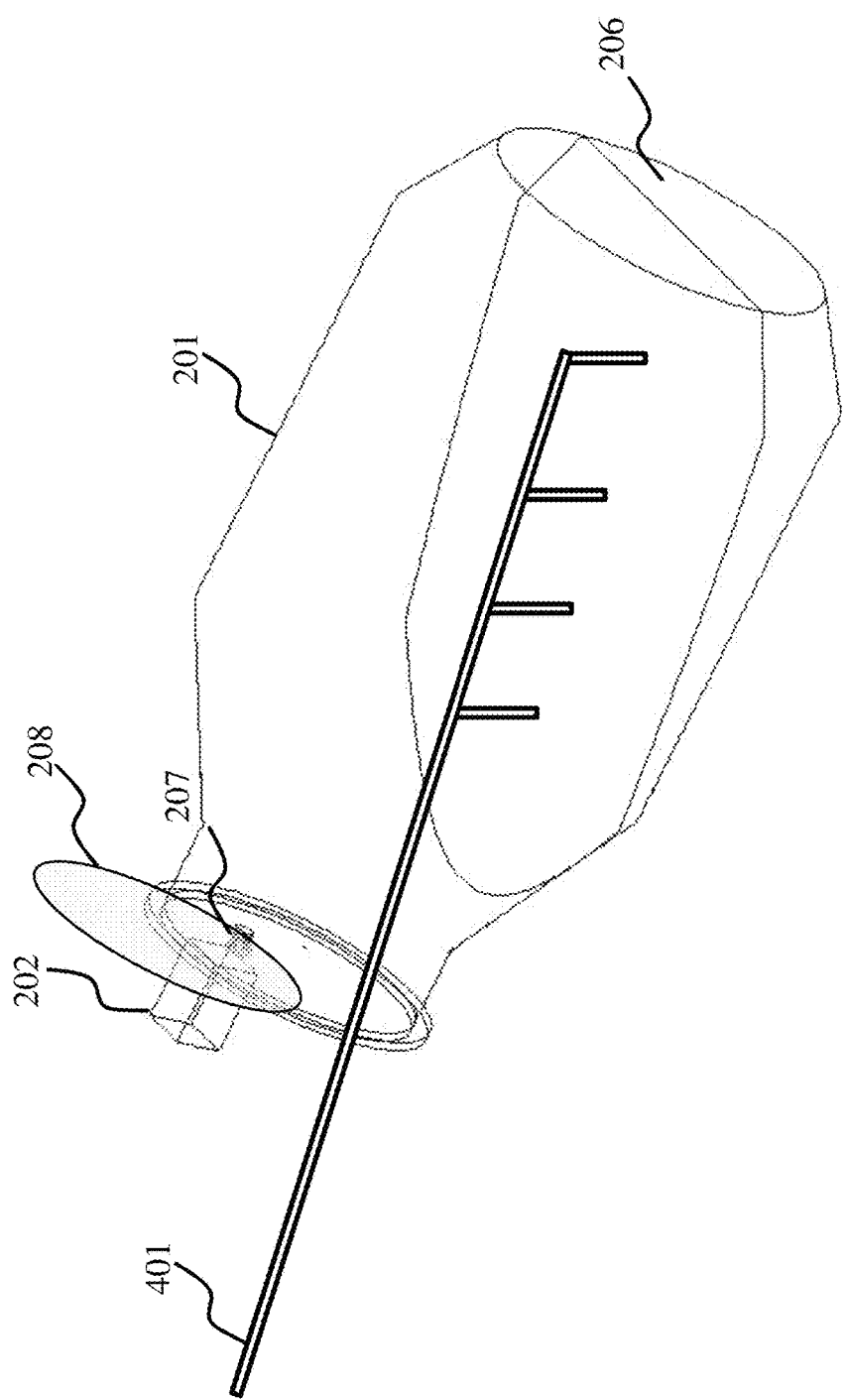
FIG. 4C is a schematic showing an embodiment of the invention in a stirring phase.

In some embodiments, the transition phase shown in FIG. 4B is followed by a stirring phase. One embodiment of a stirring phase of a method of the present invention is shown in FIG. 4C. During a stirring phase, the melt 206 is stirred by a stirring device inserted through the furnace door 208 (which is opened for that purpose) and/or by rolling or continuing to roll the furnace 201. Such stirring devices are known in the art, and include, for example, a JCB or a forklift or the like with a long attachment that is used to manually stir the molten bath. In some embodiments, during the stirring phase, the non-oxidizing gas injector 203 floods the furnace 201 with non-oxidizing gas in order to protect the molten bath 206 from oxygen inside the furnace 201. The purpose of the stirring phase is to uniformly distribute the temperature of the bath and to break up any relatively large pieces of scrap remaining. In some embodiments, the process takes between 5 and 10 minutes and may need to be repeated. Once the first stir is completed, the door is closed again and the operator will determine whether more stirring is required. In some embodiments, if more stirring is needed, a method of the present invention may repeat the transition phase, as shown in FIG. 4B, in whole or in part. During the stirring phase and with the door open, the non-oxidizing gas blanket formed by the non-oxidizing gas stream 205 remains on top of the molten bath 206 and acts as a shield against oxidation. In some embodiments, additional non-oxidizing gas is introduced during the stirring phase across the top of the melt. In one embodiment, the additional non-oxidizing gas is introduced via a rake (as shown in FIG. 4C).

Figure 4D:
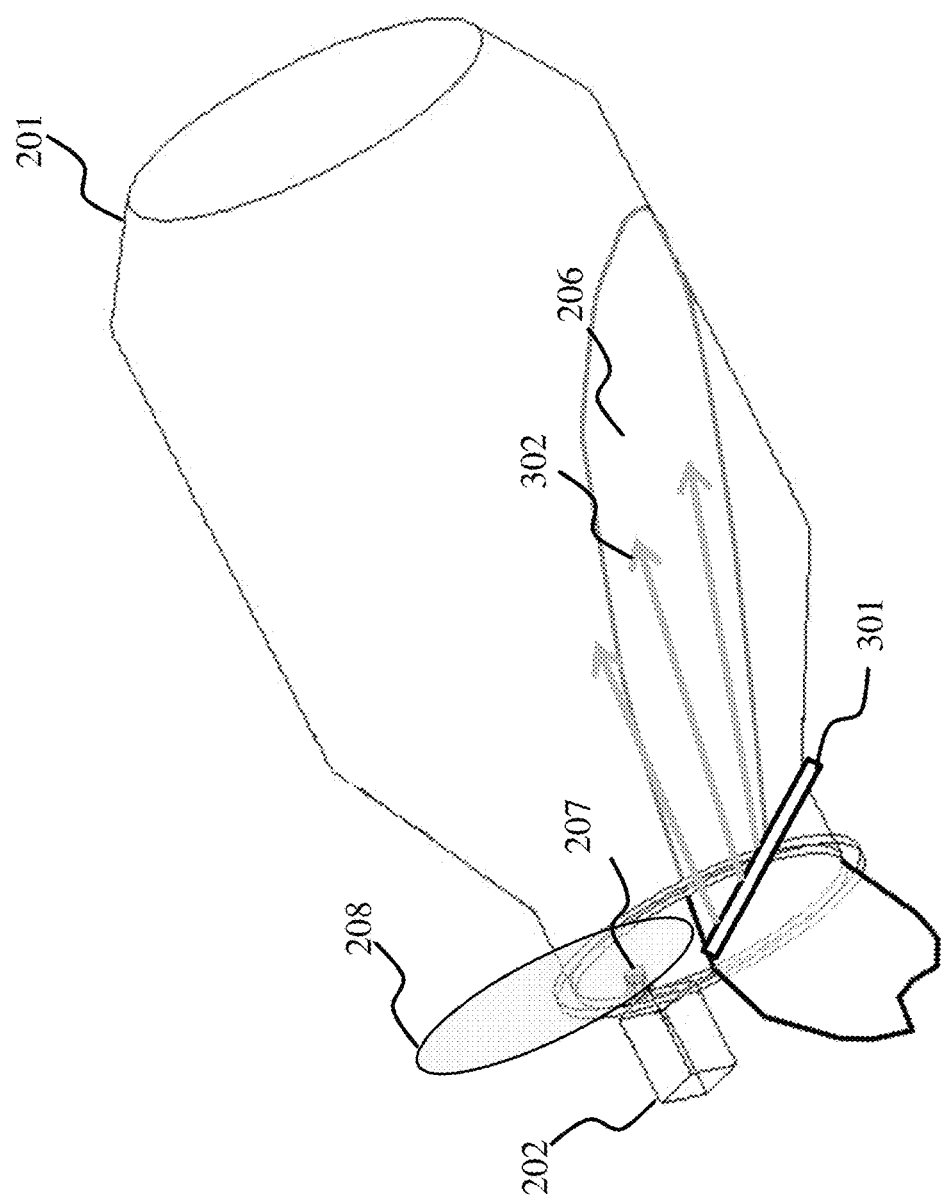
FIG. 4D is a schematic showing an embodiment of the invention in a pouring or tapping phase.

A tapping phase of a method of the present invention is shown in FIG. 4D. Preparation for tapping the molten aluminum is carried out according to normal practice. In some embodiments, the door 208 slides open, but in other embodiments, the door 208 may be attached to the furnace 201 using a mechanical arm configured to lift the door 208 away from the furnace 201 when desired, or using a hinge means so that the door 208 may tilt upward slightly to allow molten metal to pour out. When the door 208 opens and during tapping, the additional non-oxidizing gas injector 301 is used to introduce non-oxidizing gas across the surface of the melt 206. In one embodiment, the injector 301 comprises a single, flat wide-angle spray nozzle, in another embodiment, shown in FIG. 3, the injector 301 comprises several nozzles positioned along the width of the surface of the molten bath 206. In some embodiments, the injector 301 comprises a rake. In one embodiment, the non-oxidizing gas 302 is injected from the gas injector 301 at a velocity of 340 m/s. In other embodiments, the gas injection velocity may be at least at least 50 m/s, at least 200 m/s, at least 300 m/s, or at least 400 m/s. In one embodiment, as shown in FIG. 4, the gas stream 302 introduced by the injector 301 is parallel or as close to parallel as practicable to the surface of the molten bath 206. One object of the non-oxidizing gas stream 302 is to prevent or inhibit oxygen molecules from coming into contact with the aluminum, which may be accomplished by providing a blanketing layer above the molten bath 206, or by dilution of oxygen-containing gases in the furnace, or by some combination thereof. Additionally, the gas stream 302 additionally and beneficially provides cooling to the molten bath 206.

In one embodiment, a method of the present invention involves multiple alternating stirring and pouring phases, wherein the stirring is accomplished by rolling and the gas stream 302 from the injector 301 is introduced during each pouring phase in order to minimize exposure to oxygen entering through the gap in the furnace door 208.

One consequence of salt use in aluminum recycling is the accumulation of slag in the furnace. Slag is a waste product of the melting process composed mainly of oxides, salt, and aluminum. Slag is deemed hazardous waste and therefore cannot be disposed of in a landfill. Reprocessing slag costs time and money, and the slag itself captures aluminum, reducing yield. Reprocessing slag is also very energy intensive, and so methods of the present invention consume less energy than conventional recycling methods. More slag forms as more salt is added, and so slag reduction constitutes a further advantage to reducing salt use in aluminum recycling.

Slag buildup contains captured aluminum as well as impurities. When slag is exposed to oxygen, the captured aluminum and impurities undergo various exothermic reactions that can cause a significant temperature increase during the stirring (rolling) and pouring phases of a method of the invention. Compounding the problem, lower salt content in the melt results in more efficient heat transfer.

In one embodiment, a method of the present invention includes a slagging stage, wherein any slag material remaining in the furnace 201 is removed by pouring, similarly to the pouring stage shown in FIG. 4. During the slagging stage, slag comes into contact with air resulting in exothermic oxidation which can cause overheating as described above. The introduction of non-oxidizing gas during the slagging stage and the previous stages, as shown in FIG. 4, can mitigate this effect by convective cooling, since the temperature of the non-oxidizing gas is relatively colder than the temperature of the melt, as well as by blanketing or inerting the atmosphere above the melt.

In some embodiments of the methods described herein, a stratified atmosphere is formed in an aluminum furnace, the stratified atmosphere having at least one non-oxidizing layer interposed between the combustion zone and the aluminum charge to separate the combustion zone from the aluminum, and to thereby inhibit oxidation of the aluminum. As discussed above, this stratified atmosphere may employ a single non-oxidizing layer or more than one non-oxidizing layer.

The main benefit of employing stratified atmosphere protection is to significantly reduce the amount of salt required to protect the aluminum. One tradeoff is that overall furnace efficiency may be reduced slightly, due to the additional heat load of cold non-oxidizing gas added to the furnace. Additional benefits may be realized, for example improving aluminum quality and yield. One of the main purposes of adding salt into the melt is to protect the aluminum from oxidation. If the stratified atmosphere protection method is employed correctly, it is possible to significantly reduce the amount of salt required in the process. If less oxygen comes into contact with the melt, there will be less oxidation, resulting in a better yield.

Embodiments of the present invention can be operated to form one gaseous zone, two gaseous zones as in FIG. 1 or more than two gaseous zones. In all embodiments, the burner 207 combusts oxidant and fuel to create heat for melting the aluminum charge 206 positioned in the bottom of the furnace 201. The combusting oxidant and fuel creates a combustion zone or layer in the furnace space above the aluminum charge. Because the primary heat transfer mechanism to the aluminum charge 206 is by radiation rather than by convection, creating a stratified atmosphere will not significantly diminish heating of the aluminum. Also, to enhance radiative heat transfer, the oxidant in the burner may be an oxygen-enriched air, rather than air, having a molecular oxygen concentration of at least 23%, at least 30%, at least 70%, at least 90%, or at least 95%. Any standard burner can be used in this embodiment.

It is preferred that burner is high velocity burner, meaning that at least one of the oxidant and fuel is introduced into the furnace at a velocity of at least 60 feet per second, preferably at least 75 feet per second, and more preferably at least 100 feet per second. This high velocity allows the flame to penetrate the furnace sufficiently before circulating back toward the flue, which in a typical aluminum rotary furnace is located in the door above the location of the burner. It should be understood that other burner/flue configurations could also be suitable for use with systems and methods of the present invention. For example, the flue could be positioned at the back of the furnace, opposite the burner.

Figure 5:
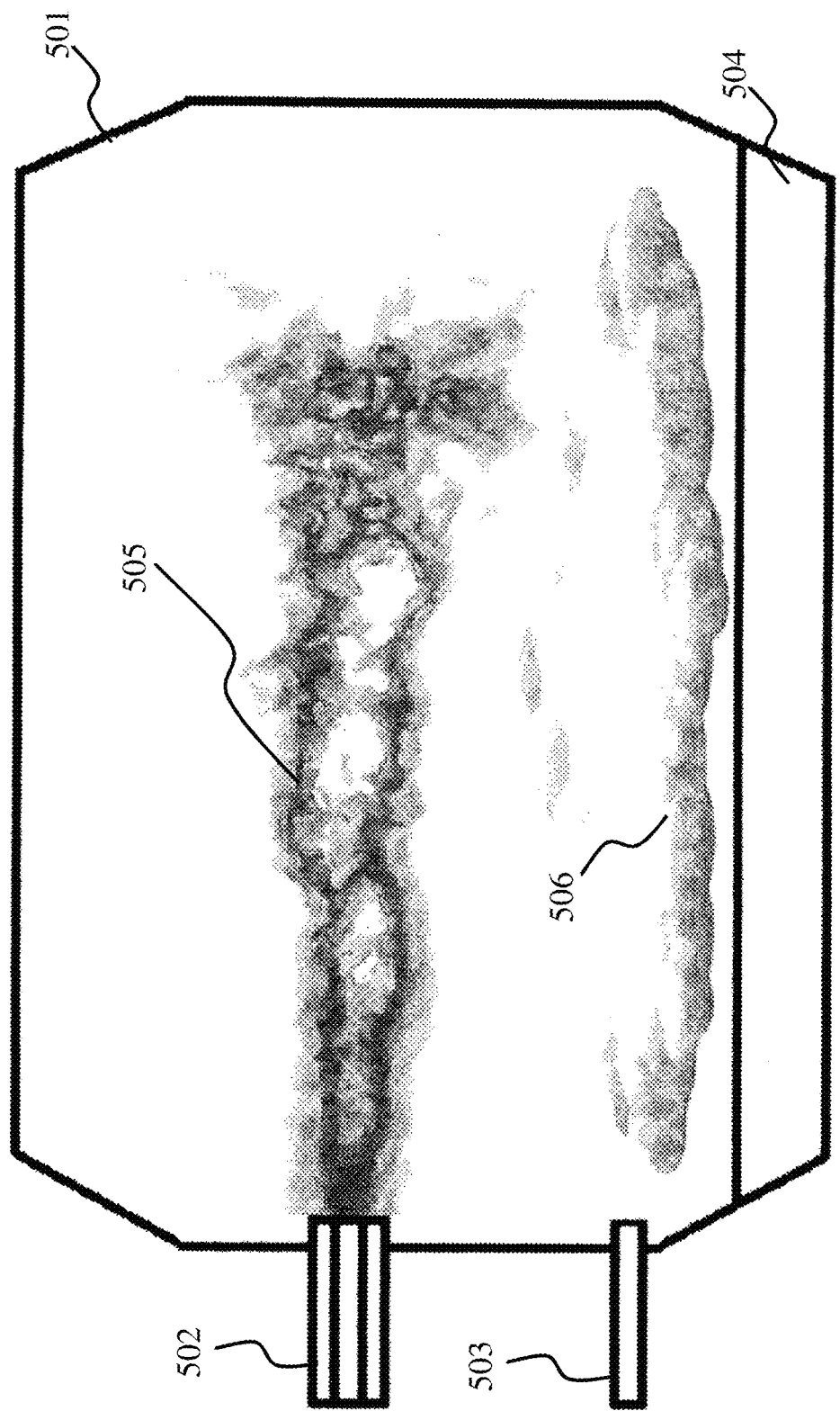
FIG. 5 is a side-view schematic showing an embodiment of a system for introducing both a combustion zone and a non-oxidizing zone between the combustion zone and an aluminum bath.

In the depicted alternate embodiment of FIG. 5, a non-oxidizing gas is introduced by an injector, nozzle, or lance 503, below a burner 502, to form a protective non-oxidizing zone or layer 506 below a combustion layer 505 emitted from the burner 502. The non-oxidizing gas is introduced near an aluminum charge or melt 504 to create a blanket or shield that further reduces the amount of oxidizer coming into contact with the aluminum 504. The non-oxidizing gas may be any gas that is not substantially involved in hydrocarbon combustion or oxidation, for example nitrogen or argon.

Figure 9:
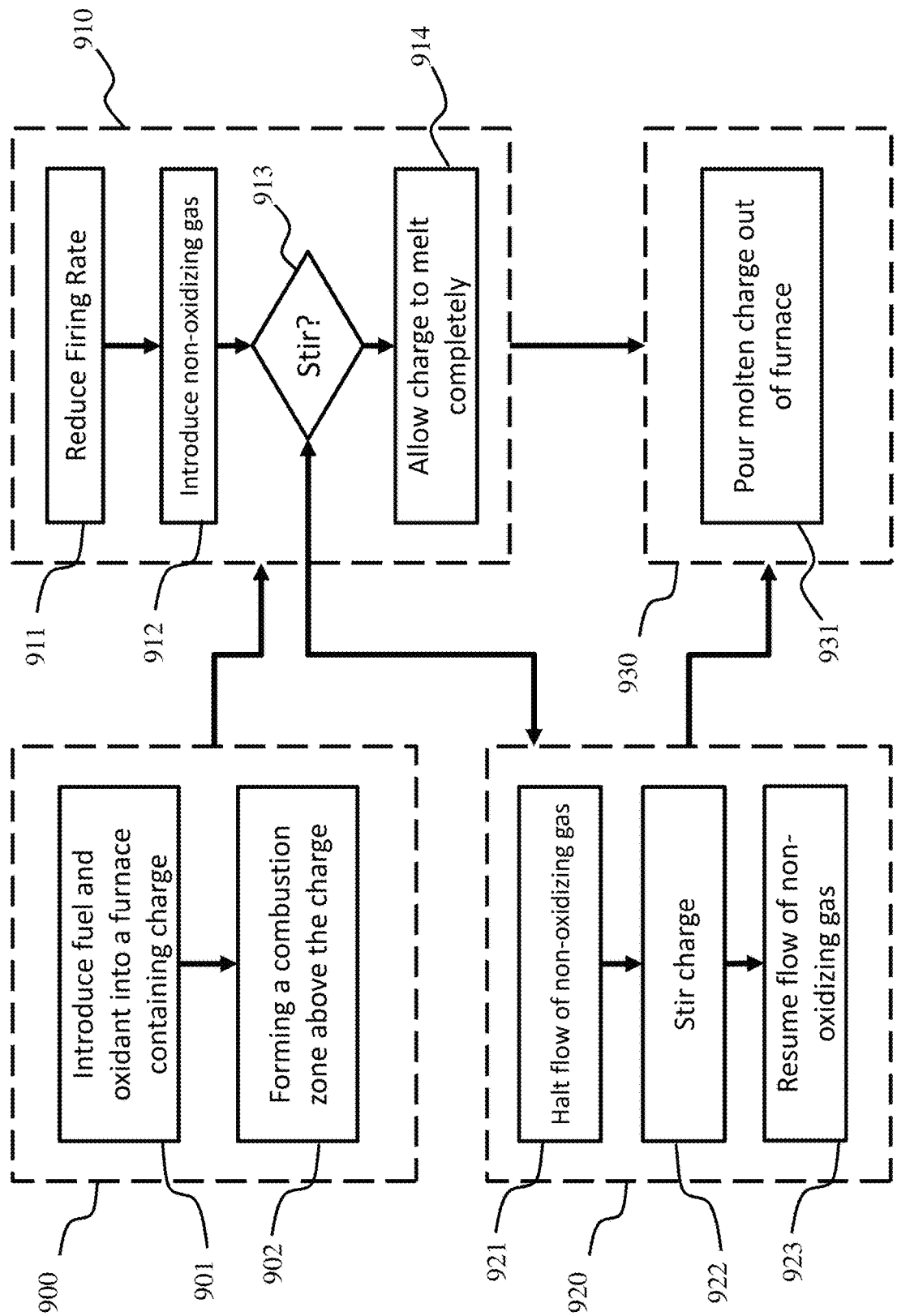
FIG. 9 is a flow diagram of a method of the invention.

In some embodiments, the present invention further includes a method of reducing salt use in an aluminum melt. With reference to FIG. 9, a method of the present invention comprises a melting phase 900, comprising the steps of introducing fuel and oxidant flows into a furnace containing a charge 901, with the fuel and oxidant reacting to form a combustion zone above the charge 902. When the aluminum charge is nearly completely molten, the method of the present invention commences a transition phase 910, comprising the steps of reducing the firing rate of the burner 911, introducing a non-oxidizing gas flow into the furnace at a first velocity to form a non-oxidizing zone between the combustion zone and the aluminum charge 912, and allowing the aluminum charge to become completely molten 914. As known in the art, the term "nearly completely molten" is understood to mean that while a majority of the charge has become molten, a minority of the charge still remains in a solid state. In some embodiments, a method of the present invention comprises one or more optional stirring phases 920. In these embodiments, after the non-oxidizing gas is introduced but before the charge has melted completely, the non-oxidizing gas flow is halted 921, the charge is stirred 922, and then the flow of non-oxidizing gas resumes at the same or a different flow rate 923. In some embodiments, methods of the present invention comprise multiple alternating stirring and transition phases. When the aluminum charge has become completely molten, the method of the present invention commences a tapping phase 930, wherein the molten aluminum charge is poured out of the furnace 931.

Preheating of the stratified gases before introduction into the furnace, and specifically preheating of the non-oxidizing gases, may be beneficial, but is not essential. In one embodiment, exhaust gas recirculation may be used to add heat to the non-oxidizing gas, either by heat exchange or by blending or mixing in. In another embodiment, exhaust gas recirculation can be used to provide the non-oxidizing layer itself. However, the addition of more water may result in excessive hydrogen absorption into the melt and may not be desirable. Optimum amounts of exhaust gas recirculation or preheating of the non-oxidizing flow may be determined experimentally.

In a typical furnace having a capacity of 5 to 40 metric tons operating with a single non-oxidizing layer, it is estimated that an initial flow rate of nitrogen or argon would be required to form a non-oxidizing gas blanket, followed by a maintenance flow rate (which may be the same or lower than the initial flow rate) to ensure that the non-oxidizing gas blanket remains sufficiently intact to cover the melt, or at least to significant dilute by mixing any oxidant that gets near the melt. An expected initial nitrogen flow rate would be from 50 to 400 normal meters cubed per hour ($Nm^3/hr$) and preferably from 50 to 200 $Nm^3/hr$, for an initial period of time, to cover the melt. The initial period of time may be at least 1 minute and less than 60 minutes, and is preferably about 5 to 30 minutes. An expected maintenance flow rate would be from 1 to 300 $Nm^3/hr$ (5% to 75% of the initial flow rate), preferably 10 to 200 $Nm^3/hr$ (20% to 50% of the initial flow rate), and more preferably 10 to 100 $Nm^3/hr$ (20% to 25% of the initial flow rate) for at least a portion of the remainder of the melt cycle.

Operationally, the melting of scrap aluminum often includes an early stage where contaminants such as paints, coatings, and other organic or volatile materials are burned off, oxidized, or vaporized from the scrap, followed by a melting stage in which the remaining aluminum metal is melted. Therefore, during the early stage, it is necessary and desirable to have an oxygen-containing atmosphere in contact with the aluminum charge, such that the system and method described herein would be operated only after such contaminants have been removed. Also, as noted above, solid aluminum scrap has a thin oxide layer protecting it from further oxidation, so that the stratified atmosphere is not necessary until break-down of that oxide layer begins. Systems and methods related to the initial stage in which contaminants are removed are described, for example, in U.S. Pat. No. 9,091,484.

Consequently, the method described herein for creating a stratified atmosphere will be applied at a later stage of the melt, when the aluminum is either almost melted or has started melting. Prior to this, the solid aluminum already has a protective aluminum oxide layer and therefore additional protection is not required.

As described herein, the main purpose of the stratified atmosphere is to replace the salt in protecting the aluminum from oxidation during the melting process. However, because salt benefits the process more than simply protecting the aluminum from oxidation, use of the stratified atmosphere system may need to be adjusted depending on the different types of scrap charged. For example, different materials may require different burner firing rates, different non-oxidizing gas velocities, or different non-oxidizing gas flow rates. In most cases, at least a percentage of the salt can be replaced with a stratified atmosphere for protection.

For example, when charging new/clean scrap, less salt will be required for breaking up oxides and for chemically removing metal impurities and therefore a high percentage of the salt could be replaced by stratified atmosphere for protection against oxidation. But scrap containing more metal impurities or oxides would still require some salt to aid breaking up of the oxides and chemical removal. Therefore, the percentage of metal impurities and oxides present within the initial scrap would affect the amount of salt that could be saved. For dirtier scrap, it is likely there would be a trade-off between salt savings and yield. Different recipes would have to be determined experimentally for individual furnaces on a case-by-case basis.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out the preferred embodiments of the present invention, and are not to be construed as limiting in any way the remainder of the disclosure.

Trials were carried out on an 8MT tilt rotary furnace with both burner and flue positioned in the door. High yielding dross (75-85%) was charged into the furnace, known as 'salt mets'. Prior to charging, the scrap material was processed into small pieces, no larger than 15 cm across. The methodology described above was followed throughout the trials. Nitrogen was used as the non-oxidizing gas in the trials and was successfully implemented, where up to 80% salt was saved. No significant issues arose from the reduction in salt or from following the non-oxidizing gas injection procedure. Performance data showed that specific gas and specific oxygen used during the experiments fell within the normal operating range. The data also showed that a significant reduction in melting time was achieved for all nitrogen injection experiments, when compared with the normal operating range. As a result, melt rate improved significantly.

Results are briefly summarized in Table 1 below. Melts 1 & 2 saved 60% salt, which equated to approximately 380 kg of salt being saved in both melts. Melt 3 saved approximately 80% salt, resulting in 500 kg of salt being saved. As shown below, the reference melts would normally be between 8.2% and 8.5% salt. By applying the method of the present invention, the salt content of the melt was reduced to 3.4% in Melt 1, 3.6% in Melt 2, and as low as 1.9% in Melt 3. All melts went well and no significant issues arose from reducing the salt. Reducing the percentage of salt results in a higher heat transfer rate, therefore the energy input into the furnace should be closely monitored towards the end of melting. It is possible that using less salt could lead to reduced slag output and hence, increased yield. However, a much larger dataset is required to provide statistical certainty on yield effects.

TABLE 1

| Test | Scrap Weight | Reference Salt Usage | Salt Used | Salt Saved |
| --- | --- | --- | --- | --- |
| Melt 1 | 7078 kg | 630 kg | 250 kg/40% | 380 kg/60% |
| Melt 2 | 6465 kg | 600 kg | 240 kg/40% | 380 kg/60% |
| Melt 3 | 6891 kg | 630 kg | 130 kg/20% | 500 kg/80% |

Furnace performance has been analyzed during the nitrogen injection experiments and compared with recent similar 'normal' melts. All recent melts containing salt mets were analyzed for important performance metrics, including specific gas, specific oxygen, cycle time and melt rate. Comparing these metrics for melts with and without nitrogen provided insight into how the introduction of relatively cold nitrogen and a reduced amount of salt charged affected furnace melting performance.

Twenty melts were identified that were comparable to the nitrogen injection tests and were used to determine baseline performance for the normal operating conditions of salt mets. The data was averaged and standard deviations were used to determine a reference range for salt mets, in which the nitrogen injection tests should fall within to meet the normal performance metrics. These reference ranges are presented in FIGS. 6-8 as blue lines with error bars representing the standard deviation for each metric. The reference data is presented as small blue data points in each figure. The figures also include data points from the nitrogen injection tests, shown as large triangles (FIG. 6), squares (FIG. 6), circles (FIG. 7) and diamonds (FIG. 8), for specific gas, specific oxygen, cycle time and melt rate respectively.

Figure 6:
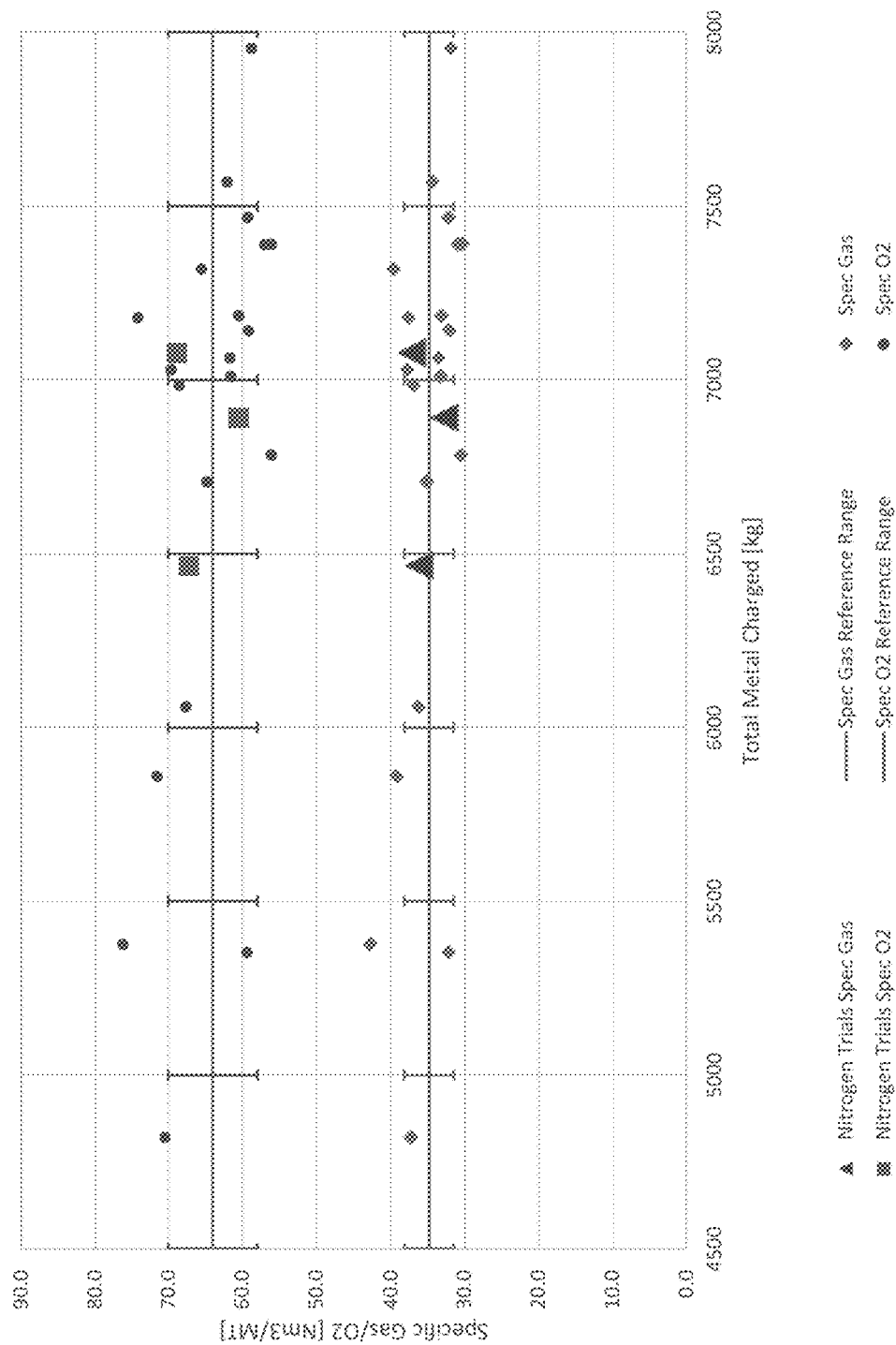
FIG. 6 is a graph of specific gas and oxygen in an experimental example of the invention.

FIG. 6 shows the specific gas and specific oxygen performance metrics. The blue data points show the spread of the reference data and the blue lines with error bars show the averaged (mean) value for normal operation. The average specific gas is 34.8 Nm³/MT of the total scrap charged. The standard deviation was calculated as 3.5 Nm³/MT, which is 10.0% of the mean and is represented by the blue error bars. The specific gas used during the nitrogen injection experiments should therefore, fall within the range of 31.3-38.3 Nm³/MT, matching the performance of a normal melt. Large red triangles represent specific gas and it can be seen that all melts fall within this range at 37.2, 36.2 and 32.7 Nm³/MT. This indicates that the non-oxidizing gas injection method does not significantly affect the amount of gas used to complete a melt.

FIG. 6 also shows specific oxygen. The data suggests the same observations are true for oxygen usage as described above for gas usage. The average specific oxygen is 64.1 Nm³/MT of the total scrap charged. The standard deviation was calculated as 6.1 Nm³/MT, which is 9.6% of the mean, represented by the blue error bars. The specific oxygen used during the nitrogen injection experiments should therefore, fall within the range of 58.0-70.2 Nm³/MT to match the performance of a normal melt. Large green squares represent specific oxygen and again, it can be seen that all melts fall within this range at 68.9, 67.3 and 60.6 Nm³/MT.

Figure 7:
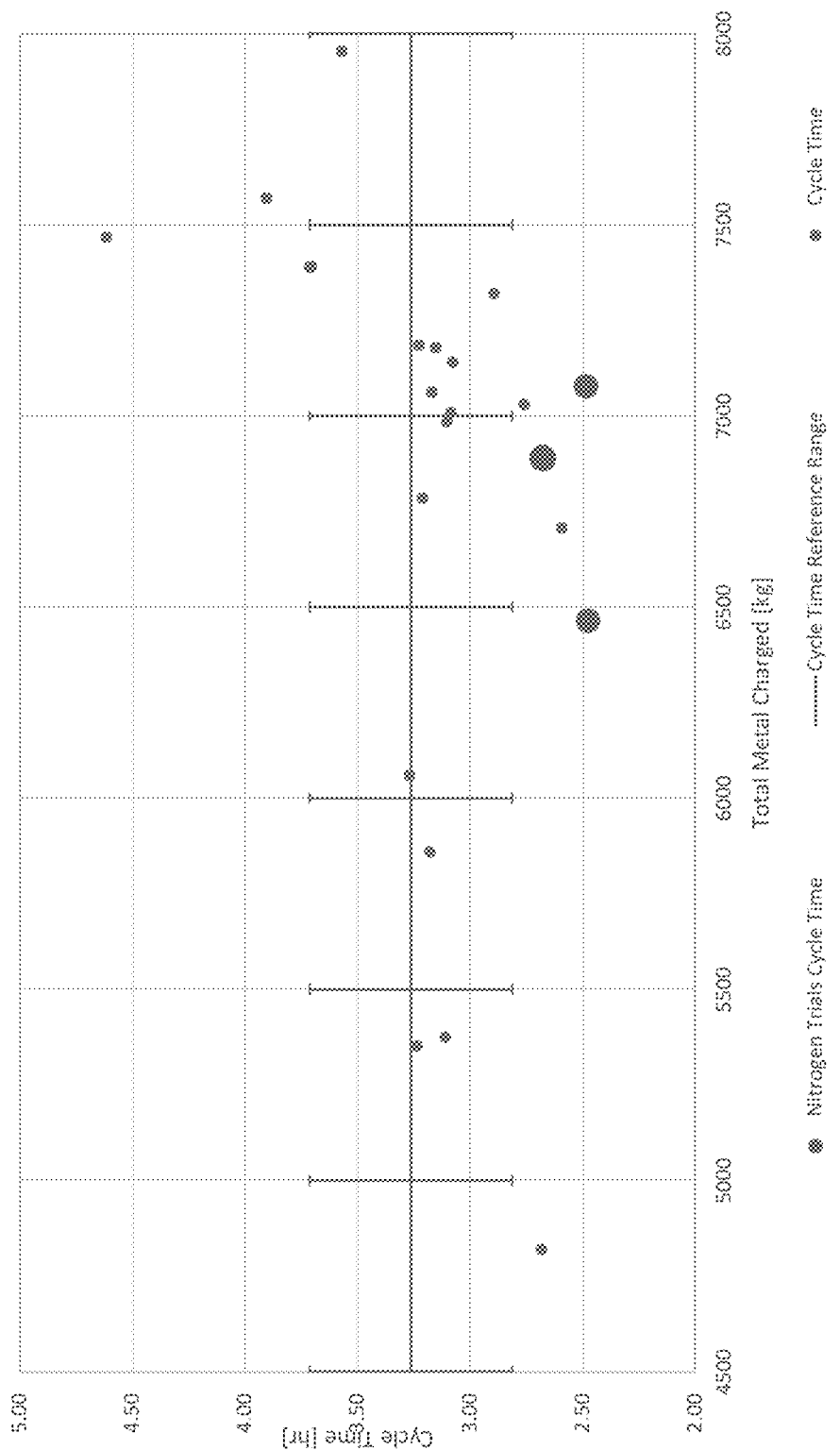
FIG. 7 is a graph of nitrogen trial cycle time in an experimental example of the invention.

FIG. 7 shows cycle time, which is recorded from when charging begins to when slagging ends. The blue data points show the spread of the reference data and the blue line with error bars show the averaged (mean) value for normal operation. The average cycle time is 3.26 hours (or 03:15:36 in hr:min:sec). The standard deviation was calculated as 0.46 hr (27.6 mins) and therefore the normal cycle range falls within 2.80-3.72 hr. Large orange circles represent the nitrogen injection data and it can be seen that the cycle time for all three melts is somewhat lower than the normal range of operation, where the cycle time for melts 1-3 are 2.48, 2.48 and 2.68 hr respectively. This is in line with expectations, as there is less material charged into the furnace and there is a higher percentage of aluminum in the charge, resulting in a higher heat transfer rate. The reduction in cycle time suggests that the non-oxidizing gas injection technique could bring an added benefit of increased production. The data shows an average reduction in cycle time of 45 minutes for salt mets. This could result in a production increase on the furnace, based on the data herein.

Figure 8:
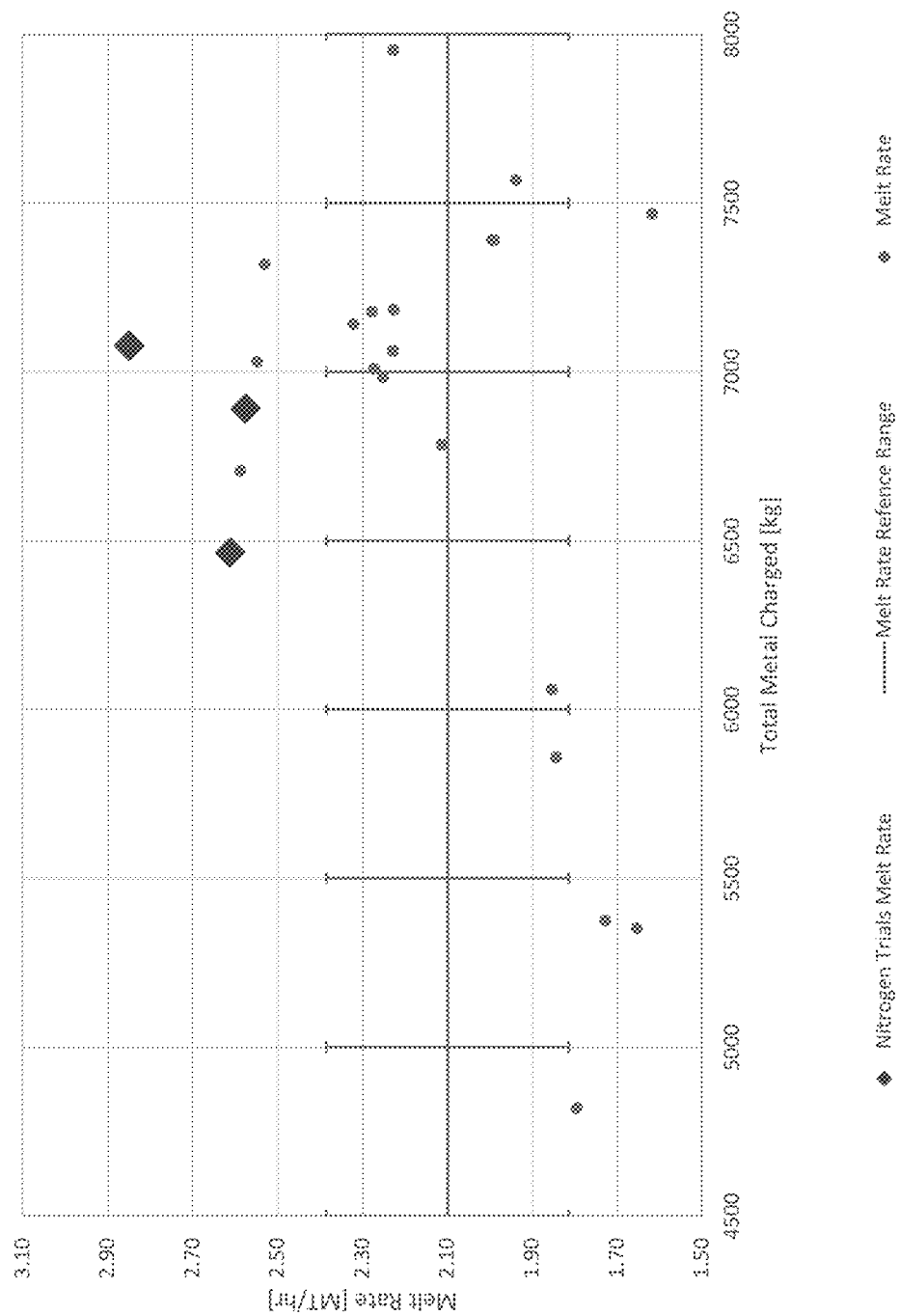
FIG. 8 is a graph of total metal charged in an experimental example of the invention.

FIG. 8 shows melt rate, which was determined from the charge weight and cycle time. The average melt rate can be seen as 2.10 MT/hr, taken across the entire cycle time. The standard deviation was calculated as 0.29 MT/hr and therefore the normal operational range is 1.81-2.39 MT/hr. The melt rate for melts 1-3 (large diamonds) was 2.85, 2.61 and 2.58 respectively. The melt rate is significantly improved when less salt is used, which is in line with expectations.

Salt mets use a relatively low amount of salt (100 kg/MT of salt mets charged), compared with other materials, such as mets and dross, which use 130 and 160 kg/MT charged respectively. The potential benefit per melt is significantly higher for those materials The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A method of melting in a furnace an aluminum charge comprising no more that 4% salt on a mass basis, the method comprising:
   during a melting phase, introducing fuel and oxidant into the furnace via a burner operating at a first firing rate, the fuel and oxidant reacting to form a combustion zone above the aluminum charge;
   terminating the melting phase and commencing a transition phase when the aluminum charge is nearly completely molten;
   during the transition phase:
      reducing the firing rate of the burner to a second firing rate that is lower than the first firing rate,
      introducing a non-oxidizing gas into the furnace at a first velocity to form a non-oxidizing zone between the combustion zone and the aluminum charge; and
      allowing the aluminum charge to become completely molten; and
   terminating the transition phase and commencing a tapping phase at a time after the aluminum charge has become completely molten; and
   during the tapping phase, pouring the molten aluminum charge out of the furnace.

2. The method of claim 1, further comprising the steps of:
   after the transition phase and before the tapping phase, commencing a stirring phase, comprising the steps of:
      halting the flow of non-oxidizing gas;
      stirring the molten aluminum charge; and
      resuming the flow of non-oxidizing gas at a second velocity.

3. The method of claim 2, wherein the molten aluminum charge is stirred by one or both of an implement attached to a construction vehicle and rolling the furnace about an axis.

4. The method of claim 1, further comprising, during the tapping phase, flowing the non-oxidizing gas at a third velocity over the molten aluminum charge while pouring the molten aluminum charge out of the furnace.

5. The method of claim 1, wherein the non-oxidizing gas is an inert gas, and wherein the non-oxidizing zone is an inert zone.

6. The method of claim 5, wherein the inert gas is selected from the group consisting of nitrogen, argon, and a mixture of nitrogen and argon.

7. The method of claim 1, wherein the flow of non-oxidizing gas is introduced at an angle complementary to an angle of the flow of fuel and oxidant, such that the flow of the non-oxidizing gas and the flow of the fuel and oxidant will not substantially disturb one another.

8. The method of claim 7, wherein the flow of non-oxidizing gas forms a blanket above the molten aluminum.

9. The method of claim 1, wherein the first velocity of the non-oxidizing gas flow is at least 400 m/s.

10. The method of claim 2, wherein the second velocity of the non-oxidizing gas flow is equal to or less than the first velocity.

11. The method of claim 4, wherein the third velocity of the non-oxidizing gas flow is equal to or less than the first velocity and is at least 200 m/s.

12. The method of claim 4, further comprising, during the tapping phase:
   cooling the flow of non-oxidizing gas; and
   convectively cooling the molten aluminum with the flow of non-oxidizing gas.

* * * * *